(12) United States Patent
Fukano

(10) Patent No.: US 7,869,063 B2
(45) Date of Patent: Jan. 11, 2011

(54) PRINTING APPARATUS, PRINTER CONTROL METHOD, PRINTER CONTROL PROGRAM, AND PRINTING SYSTEM

(75) Inventor: Kazuko Fukano, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 1059 days.

(21) Appl. No.: 11/325,989

(22) Filed: Jan. 5, 2006

(65) Prior Publication Data

US 2006/0279757 A1  Dec. 14, 2006

(30) Foreign Application Priority Data

Jun. 8, 2005  (JP)  ............... 2005-167840

(51) Int. Cl.
*G06F 3/12*  (2006.01)
*G06K 15/00*  (2006.01)

(52) U.S. Cl. ............... 358/1.1; 358/1.13; 358/1.14

(58) Field of Classification Search .......... 358/1.13, 358/1.14

See application file for complete search history.

(56) References Cited

U.S. PATENT DOCUMENTS

| 5,664,074 | A | 9/1997 | Kageyama et al. |
| 6,132,117 | A | 10/2000 | Fukano et al. |
| 6,388,760 | B2 * | 5/2002 | Kadota et al. ............ 358/1.14 |
| 6,491,453 | B1 | 12/2002 | Fukano et al. |
| 6,910,817 | B2 | 6/2005 | Fukano |

FOREIGN PATENT DOCUMENTS

| EP | 0 652 533 | 5/1995 |
| EP | 0 945 824 | 9/1999 |
| EP | 1 106 368 | 6/2001 |
| JP | 08-328786 | 12/1996 |
| JP | 9-226209 | 9/1997 |
| JP | 10-232752 | 9/1998 |
| JP | 11-099730 | 4/1999 |
| JP | 11-268384 | 10/1999 |
| JP | 2001-147867 | 5/2001 |
| JP | 2005-7762 | 1/2005 |

* cited by examiner

*Primary Examiner*—Benny Q Tieu
*Assistant Examiner*—Ngon Nguyen

(57) ABSTRACT

A processing mode appropriate to the cause of the error is selected when an error occurs in a printer, thereby avoiding wasting processing time and consumables. The printing apparatus has a normal processing mode control unit for printing based on data sent from a host device; a deletion processing mode control unit for discarding data except for specific commands sent from the host device; an error detection unit for detecting errors; a cause of error determination unit for identifying the cause of the error; a processing mode storage unit for storing the processing modes as well as information pertaining to which processing mode to be executed for a particular cause of error when an error occurs; and a processing mode determination unit for selecting the normal processing mode control unit or deletion processing mode control unit to execute the appropriate processing mode stored in the processing mode storage unit according to the cause of error identified by the cause of error determination unit when the error detection unit detects an error, and to select the normal processing mode control unit to change from the deletion processing mode to the normal processing mode based on a resume command from the host device.

18 Claims, 11 Drawing Sheets

ERROR STATE MODE SELECTION COMMAND

| ESC A m1 m2 m3 |
|---|
| m1 = 0: DO NOT ENTER DELETION PROCESSING MODE<br>m1 = 1: CLEAR ALL UNPRINTED DATA,<br>  THEN ENTER DELETION PROCESSING MODE<br>m1 = 2: SAVE DATA IN RECEIVE BUFFER,<br>  AND ENTER DELETION PROCESSING MODE |
| m2 = 0: DO NOT SEND THE mode_change RESPONSE<br>m2 = 1: SEND THE mode_change RESPONSE |
| m3 = 0: APPLY TO ALL CAUSES<br>m3 = 10: cause_of_error IS PAPER CUTTER ERROR<br>m3 = 11: cause_of_error IS CARRIAGE OPERATION ERROR<br>m3 = 20: cause_of_error IS COVER A IS OPEN<br>m3 = 21: cause_of_error IS COVER B IS OPEN<br>m3 = 30: cause_of_error IS NO PAPER<br>m3 = 40: cause_of_error IS NO INK |

FIG. 5A

RESUME_PRINTING COMMAND

| ESC B d1...dk |
|---|
| d1...dk: DESIRED KEYWORD |

FIG. 5B

PROCESSING MODE CONFIRMATION COMMAND

| ESC C m |
|---|
| m = 1: REQUEST PROCESSING MODE CONFIRMATION |

FIG. 5C

PRINTING APPARATUS, PRINTER CONTROL METHOD, PRINTER CONTROL PROGRAM, AND PRINTING SYSTEM

RELATED APPLICATION

Japanese patent application No. 2005-167840 is hereby incorporated by reference in its entirety.

BACKGROUND OF THE INVENTION

1. Field of the Invention

The present invention relates to a printing apparatus for printing according to data sent from a host device, to a control method for a printing apparatus, a program by which such a method is specified, and a printing system including a printing apparatus and a host device.

2. Description of the Related Art

When the paper runs out, a cover is opened, a paper jam occurs, or other problem that renders the printer unable to print occurs, in a printer that is used connected to a host device, printers conventionally run an error recovery process such as outlined below and taught in JP-A-2005-7762 (U.S. Pat. No. 6,910,817) to recover from the problem.

(1) When a problem occurs, the printer sends an error status report to the host device and processes the unprinted data according to a predetermined processing mode. The selectable processing modes are as follows:

(a) The content of the receive buffer and the print buffer is saved and the normal processing mode is continued without going to a deletion processing mode.

(b) The content of the receive buffer and the printer buffer is discarded and a deletion processing mode is entered.

(2) When the host device that is monitoring the status of the printer receives the error status report from the printer, it interrupts data transmission.

(3) When the printer confirms that the cause of the error or problem has been resolved, it sends an error recovery status report to the host device and returns to the normal processing mode. If unprocessed data remains in the receive buffer as noted in (a) above, the unprocessed data is processed.

(4) When the host device receives the error recovery status report from the printer, it executes a data transmission process based on the selected processing mode. If processing mode (a) above is selected, data transmission resumes from the unsent data following the previously transmitted data. If processing mode (b) above is selected, the unsent data is discarded and all data is resent from the beginning of the previously transmitted data.

There are, however, many different factors that can create an error, and the appropriate processing mode may differ according to the cause of the error. The prior art described above specifies a common processing mode for all causes of errors, but the specified processing mode is not necessarily appropriate to all causes of errors.

For example, if the cause of the error is that the supply of roll paper ran out, the already printed portion and the portion printed to the new roll paper will be printed on separate pieces of paper if processing mode (a) above is used. Processing mode (b) is therefore preferable in this case so that all data is reprinted from the beginning on the new roll of paper. Once a new roll of paper is loaded and the error is cancelled, data transmission from the host will resume from the unprocessed data continuing from the data that was transmitted before the paper ran out if processing mode (a) is selected. The printer will thus print the data remaining in the receive buffer and the print buffer as well as the previously untransmitted data sent from the host after operation resumes. The printout will therefore be split between the paper that was printed before the paper ran out and the new supply of paper. Printing must be repeated from the beginning in this case if a printout on a single sheet of paper is desired.

Furthermore, if the cause of the error is an open cover and the printer is designed to automatically resume normal operation when the cover is closed, it is preferably to continue printing the unprinted data following the already printed data by executing processing mode (a) above. If processing mode (b) is selected in this case, data transmission from the host resumes when the cover is closed and the open cover error is cancelled, the untransmitted data is discarded, and all data is resent from the beginning of the previously transmitted data. The printer then prints all of the data sent from the host after operation resumes. Thus, the previously transmitted data will be printed a second time even though printing all data has already been completed if the untransmitted data is sent following the previously sent data.

Executing an inappropriate processing mode thus wastes processing time and consumables such as paper and ink.

SUMMARY OF THE INVENTION

A printing apparatus, printing apparatus control method, program, and printing system according to the present invention solve the foregoing problem by enabling selection of the processing mode based on the cause of the error when an error occurs, thereby eliminating wasted processing time and consumables.

In one aspect of the invention, a printing apparatus comprises a normal processing mode control unit for printing based on data sent from a host device; a deletion processing mode control unit for discarding data, except for specific commands sent from the host device; an error detection unit for detecting errors; a cause of error determination unit for identifying the cause of each detected error; a processing mode storage unit for storing multiple processing modes and information pertaining to which processing mode is to be executed for a particular cause of error, when an error occurs; and a processing mode determination unit for selecting the normal processing mode control unit or deletion processing mode control unit to execute one of the stored processing modes according to the cause of error identified by the cause of error determination unit when the error detection unit detects an error, and for selecting the normal processing mode control unit to change from the deletion processing mode to the normal processing mode based on a resume command from the host device.

Thus comprised, the printing apparatus can operate in the processing mode appropriate to the cause of the error; that is, it can continue in the normal processing mode or change to the deletion processing mode, depending on the situation. By changing to the deletion processing mode that discards data when a printer error is detected, data that was processed but not sent before the host device interrupted the data transmission process will not be processed, and data that had already been sent when transmission was interrupted will not be wastefully printed when printing resumes after the error is corrected.

Furthermore, by continuing the normal processing mode when a printer error is detected, printing can continue from where printing stopped when the error occurred, after the error is corrected and printing resumes, and printing can proceed without interruption before an error occurs and again after it is corrected.

Preferably, the printing apparatus also has a receive buffer for storing the data sent from the host device; and a print buffer for storing image data. In this embodiment, the deletion processing mode preferably includes a first deletion processing mode for discarding data in the receive buffer and image data in the print buffer, and a second deletion processing mode for saving data in the receive buffer and discarding image data in the print buffer.

In this embodiment of the invention, the printing apparatus can appropriately discard data in the receive buffer and/or image data in the print buffer according to the cause of the error. If the first deletion processing mode is selected, for example, received data buffered to the receive buffer and image data written to the print buffer can be discarded when the deletion processing mode is entered, thereby shortening the time needed in the deletion processing mode to delete data in the receive buffer. If the second deletion processing mode is selected, the deletion processing mode is activated while retaining the data stored in the receive buffer, and the normal processing mode can therefore be resumed by a resume printing command when such a command is embedded in data that had already been transmitted or that was already processed but not transmitted when the host device interrupted the data transmission process. Therefore, when a resume printing command is embedded in each page of data, printing can resume from the page after the page that was being printed when the error occurred.

Preferably, the processing mode storage unit stores the information pertaining to which processing mode is to be executed for a particular cause of error based on a selection command from the host device. Yet further preferably, the selection command includes a first parameter having a value that specifies a particular cause of error and a second parameter having a value that specifies a particular processing mode. The first parameter can be set to a value that specifies any or all causes of error.

Thus comprised, the host device can easily set and change the processing mode for each cause of the error.

Yet further preferably, the processing mode determination unit selects the normal processing mode control unit to change from the deletion processing mode to the normal processing mode when a key code contained in the resume command matches a predefined key code.

Operating errors caused by an accidental match can thus be avoided.

Further preferably, the printing apparatus also has a response transmission unit for sending a start deletion process response to the host device in conjunction with a change from the normal processing mode to the deletion processing mode, and sending an end deletion process response to the host device in conjunction with a change from the deletion processing mode to the normal processing mode.

Yet further preferably, the response transmission unit, in response to a status inquiry command from the host device, sends the start deletion process response when in the deletion processing mode and sends the end deletion process response when in the normal processing mode.

Thus comprised, the host device can know the processing mode of the printing apparatus because a start deletion process response and an end deletion process response can be sent to the host device. The host device can also know from the end deletion process response that the resume printing command was processed normally.

Yet further preferably, the processing mode storage unit also stores information indicating whether to send a response.

Yet further preferably, the processing mode storage unit stores information indicating if a response is to be sent for a particular cause of error based on a selection command from the host device.

By not sending either response to the host device, the method of the invention can be made compatible with applications that do not monitor the status of the printer. Whether a response is sent can also be controlled according to the cause of the error.

A printing system according to another embodiment of the invention comprises a printing apparatus as described above and a host device for controlling the printing apparatus. The host device has a data transmission unit that stops data transmission to the printing apparatus and deletes unsent data based on a start deletion process response from the printing apparatus, and sends the resume command to the printing apparatus based on an error recovery report from the printing apparatus, and resumes data transmission to the printing apparatus based on an end deletion process response from the printing apparatus.

Thus comprised, the appropriate processing mode can be selected and the appropriate action can be taken according to the cause of the error that occurred in the printer. For example, if using an application that monitors the status of the printing apparatus, the host device can control the timing of when the resume printing command is sent. Data that has not finished printing (data that the host device wants to delete) can thus be reliably deleted, and printing unnecessary data can be prevented.

The present invention can also be implement as a control method for a printing apparatus. This control method also achieves the same action and effect described herein.

The control method of the invention can be specified by a control program that can be executed by the control unit of the printing apparatus, and can be provided on a suitable recording medium that stores this control program.

Other objects and attainments together with a fuller understanding of the invention will become apparent and appreciated by referring to the following description and claims taken in conjunction with the accompanying drawings.

BRIEF DESCRIPTION OF THE DRAWINGS

FIGS. 5A to 5C show exemplary control command statements.

DESCRIPTION OF THE PREFERRED EMBODIMENTS

A preferred embodiment of the present invention is described below with reference to the accompanying figures. When a printer that is connected to a host device detects a printer problem, such as the printer going off-line or a printer error, this invention enables the printer to execute a specific processing mode (continuing the normal processing mode or going to a deletion processing mode) previously set for the specific cause of the printer problem (error), thus enabling the printer to appropriately resume operation according to the cause of the problem.

A printing apparatus and printing system according to the present invention are described below using by way of example a host device (cash register terminal) and printer (receipt printer) used in a POS system. A program according to the present invention as described in the accompanying claims enables a host device and printer according to the present invention to function, and detailed description of this program is omitted below.

Figure 1:
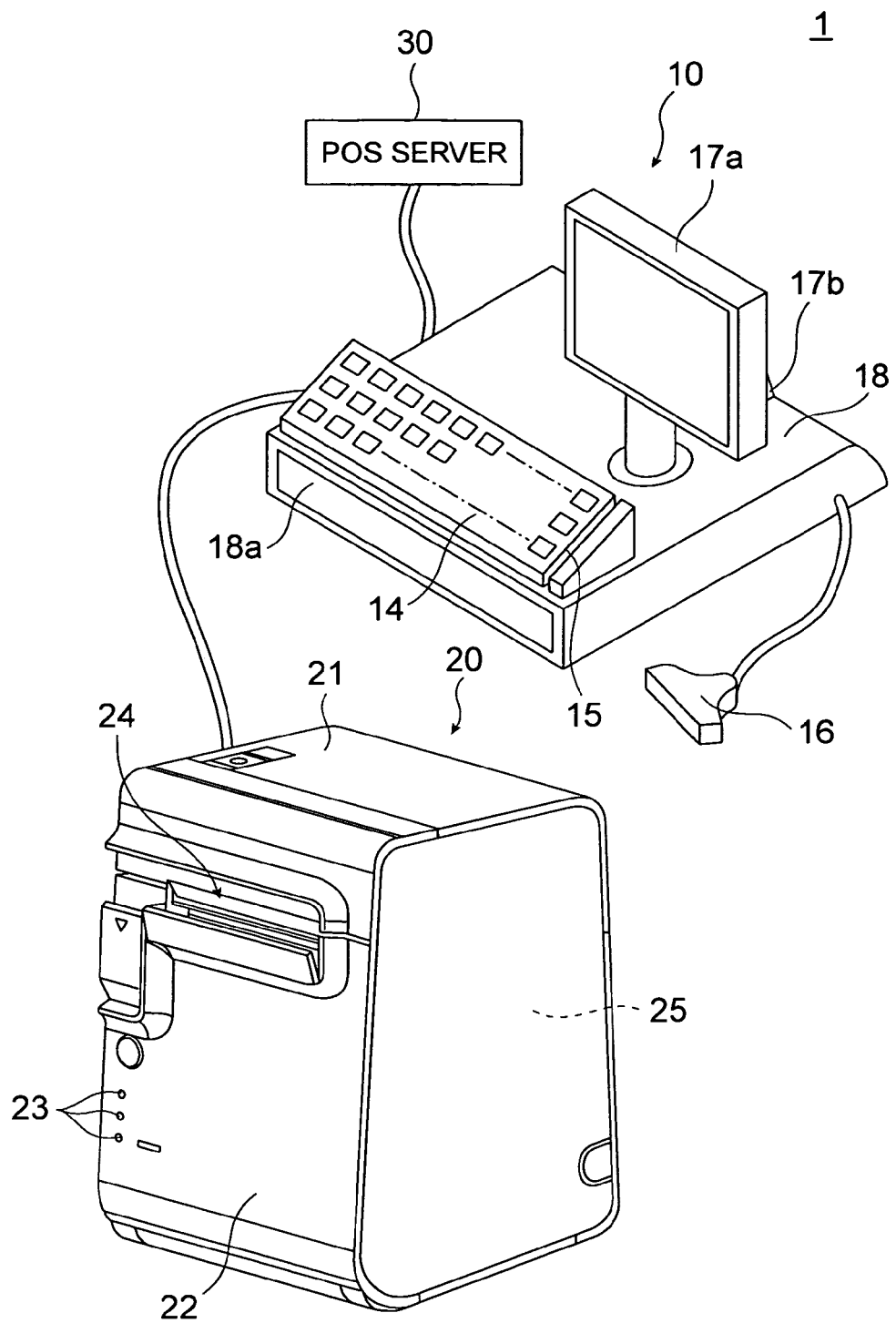
FIG. 1 shows a printing system configured according to a preferred embodiment of the present invention.

FIG. 1 shows the configuration of a printing system 1 (POS system) according to a preferred embodiment of the present invention. As shown in FIG. 1 a printing system 1 according to this embodiment of the invention includes at least one host device 10 and printer 20, and a POS server 30. The host 10 executes a transaction process according to product information input by an operator, and generates print data used for printing sales receipts, for example. The printer 20 prints according to control data and print data sent from the host 10. Plural hosts 10 (POS terminals in this embodiment), of which only one is shown in FIG. 1, are connected to the POS server 30, which serves and controls the hosts 10. One host 10 and printer 20 together constitute one POS terminal operated by a single operator.

The host 10 has a keyboard 14 that is located at the top front of the case 18 and is used by the operator to enter product information, an operator display 17a at the back right part of the case 18 enabling the operator to confirm the entered data, and a cash drawer 18a inside the case 18. A barcode scanner 16 for reading barcodes on the products is connected to the right side of the case 18, and a card reader 15 with a slot for reading customer credit cards, for example, is disposed to the right side of the keyboard 14 in this system. A customer display 17b enabling the customer to confirm the entered product information is also located on the back side of the case 18.

The host 10 also generates print data based on the product information input from the keyboard 14 or barcode scanner 16, and sends the print data to the printer 20. The host 10 also receives status reports and responses from the printer 20 to monitor the printer status, including if an error has occurred and the processing mode (normal processing mode or deletion processing mode, described further below), and sends control data and commands to control the printer 20.

The printer 20 has a case 21 with an open front, and a cover 22 for opening and closing the front opening. When the cover 22 is open, continuous paper P can be loaded and the inside of the printer can be accessed for maintenance and inspection. The continuous paper P is typically in a roll, and is stored in the paper storage unit 25 inside the printer. The free end of the roll paper P is delivered externally to the case 21 from the paper storage unit 25 through a paper exit 24 formed in the cover 22. A paper cutter mechanism (not shown) is also disposed on the inside of the paper exit 24.

The printer 20 is connected to the host 10 through a cable and connector, for example, and controls printing according to print commands from the host 10 to print sales receipts, for example. That is, a print head 122 (inkjet head) and ink supply unit 125 are controlled according to commands from the host 10 to print characters (such as letters and symbols) and images (such as a logo), and drives the paper feed motor 124 to convey the roll paper P toward the paper exit 24 (see FIG. 4). When printing is completed, the roll paper P is fed until the trailing end of the printed part reaches the cutting position of the paper cutter. The paper cutter motor 131 is then driven to cut the paper by means of paper cutter 132 so that the printed paper can be removed from the paper exit 24 and given to the customer.

Multiple LEDs 23 are located at the front of the case 21 to indicate the cause of particular problems inside the printer 20. The LEDs 23 are driven to light steadily or to blink according to the particular problem or error, including when there is no paper P in the paper storage unit 25 (i.e., the paper supply is depleted), the ink supply is depleted, a paper jam occurs, or another error occurs that prohibits or makes it difficult to continue printing.

Figure 2:
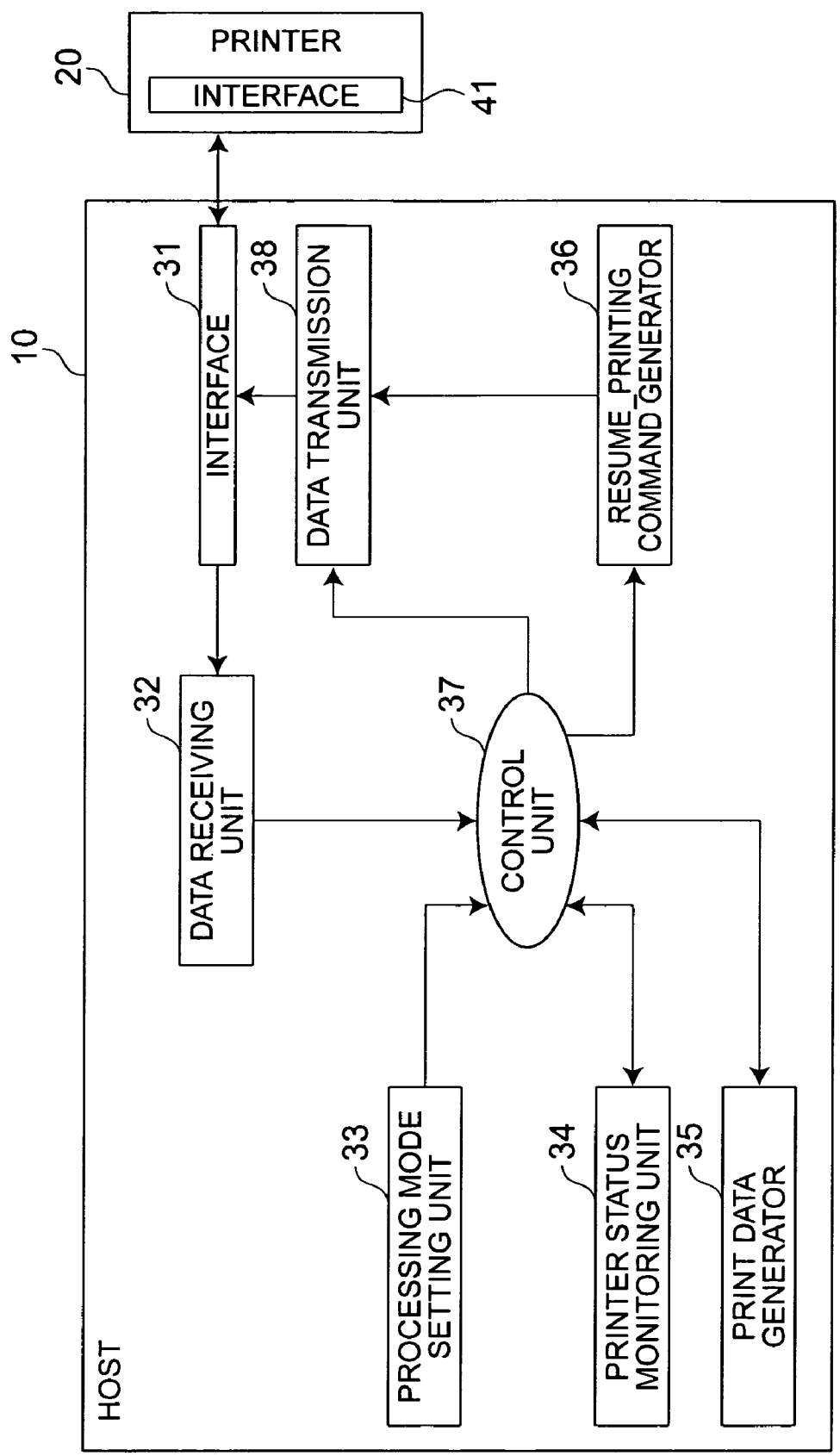
FIG. 2 is a function block diagram showing a control configuration of the host.

The control configuration of this host 10 is described next with reference to FIG. 2, which is a function block diagram of the host 10. As shown in FIG. 2, the host 10 has an interface 31 for data communication with the printer 20; a data receiving unit 32 functioning as a receive buffer for storing status reports, responses, and other data from the printer 20; a mode setting unit 33 for running a mode selection process including generating commands for setting either the normal processing mode or the deletion processing mode as the operating mode when a printer error occurs; a status monitoring unit 34 for monitoring the printer status based on status data and responses from the printer 20; a print data generator 35 for generating print data for printing on roll paper P; a resume_printing command generator 36 for generating a resume_printing command to terminate the deletion processing mode of the printer 20; a control unit 37 for controlling operation of the host 10; and a data transmission unit 38 for sending commands and print data, and functioning as a data buffer managed by the application and data transmission buffer managed by the OS.

The monitoring unit 34 monitors the status of the printer 20, such as whether the paper or ink supply has run out, by receiving so-called ASB (Automatic Status Back) reports from the printer 20. The progress of data processing in the printer 20 is also monitored using a process ID response, a start_deletion_process response, and an end_deletion_process response, for example.

The ASB function automatically reports to the host 10 when there is a change in certain printer state information.

The process ID response is a response sent according to the process ID inserted optionally by the host 10 in control commands or print data and sent to the printer 20, and indicates that the control command or print data was processed by the printer 20. This enables the host 10 to send data synchronized to the internal status of the printer 20.

The start_deletion_process response and end_deletion_process response are responses indicating that the deletion processing mode of the printer 20 started or stopped, respectively. The end_deletion_process response therefore also indicates the normal processing mode was resumed. These responses enable the host 10 to know the current processing mode of the printer 20. The printer 20 processing modes and these responses are described in further detail below.

When the printer 20 is set to the normal processing mode, the control unit 37 runs the normal operating process (sending print data and control commands). When the monitoring unit 34 detects that the printer 20 has entered the deletion processing mode (that is, detects the start_deletion_process response), the control unit stops any data transmission process currently running. When an error recovery status report is received from the printer 20, processing passes to the resume_printing command generator 36 and a resume_printing command is output. When the monitoring unit 34 then detects that the printer 20 resumed the normal processing mode (that is, detects the end_deletion_process response), the print data transmission process is resumed.

The control configuration of the printer 20 is described next with reference to FIG. 3, which is a function block diagram of the printer 20, and FIG. 4, which is a control block diagram of the printer 20.

Figure 3:
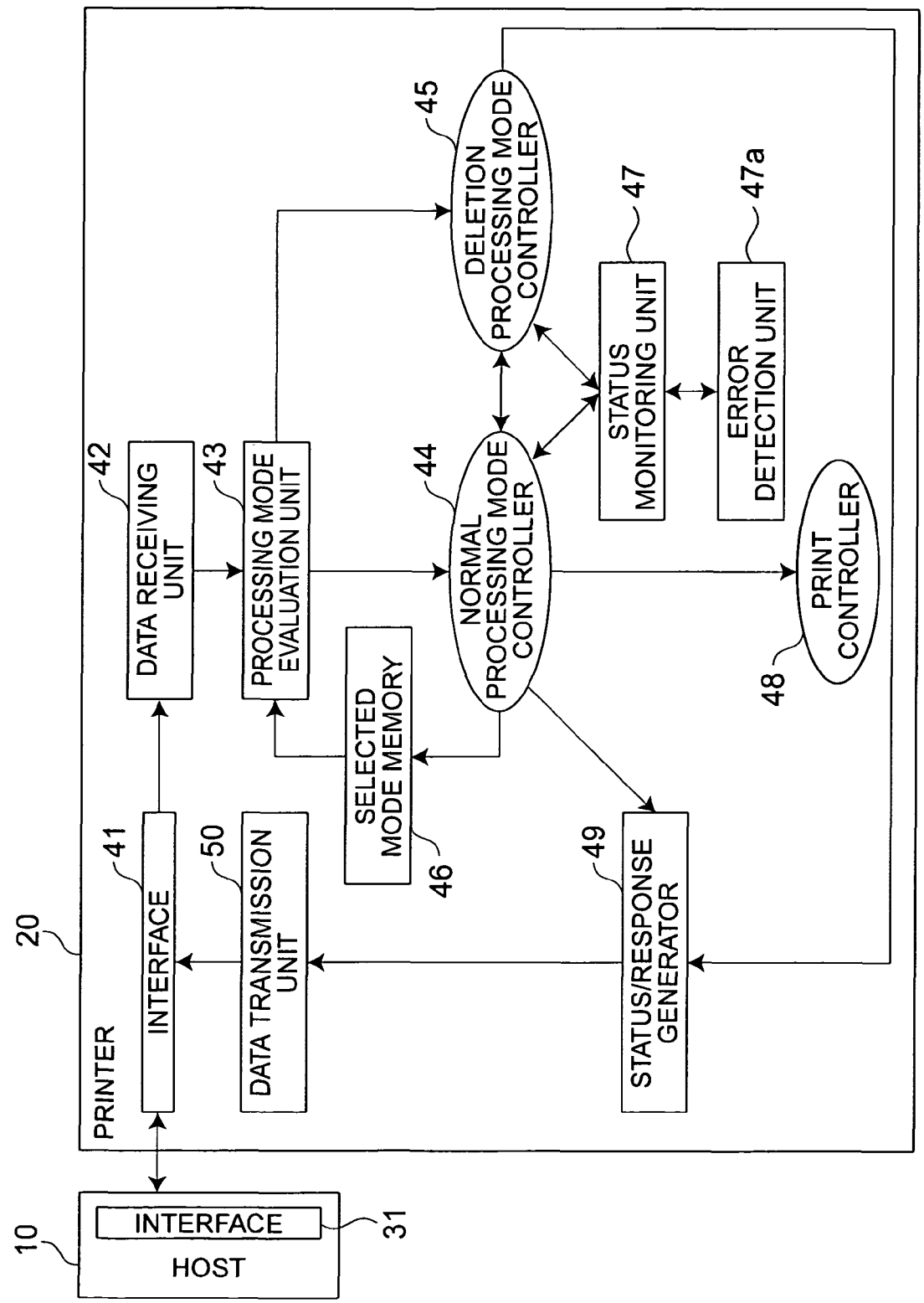
FIG. 3 is a function block diagram showing a control configuration of the printer.
Figure 4:
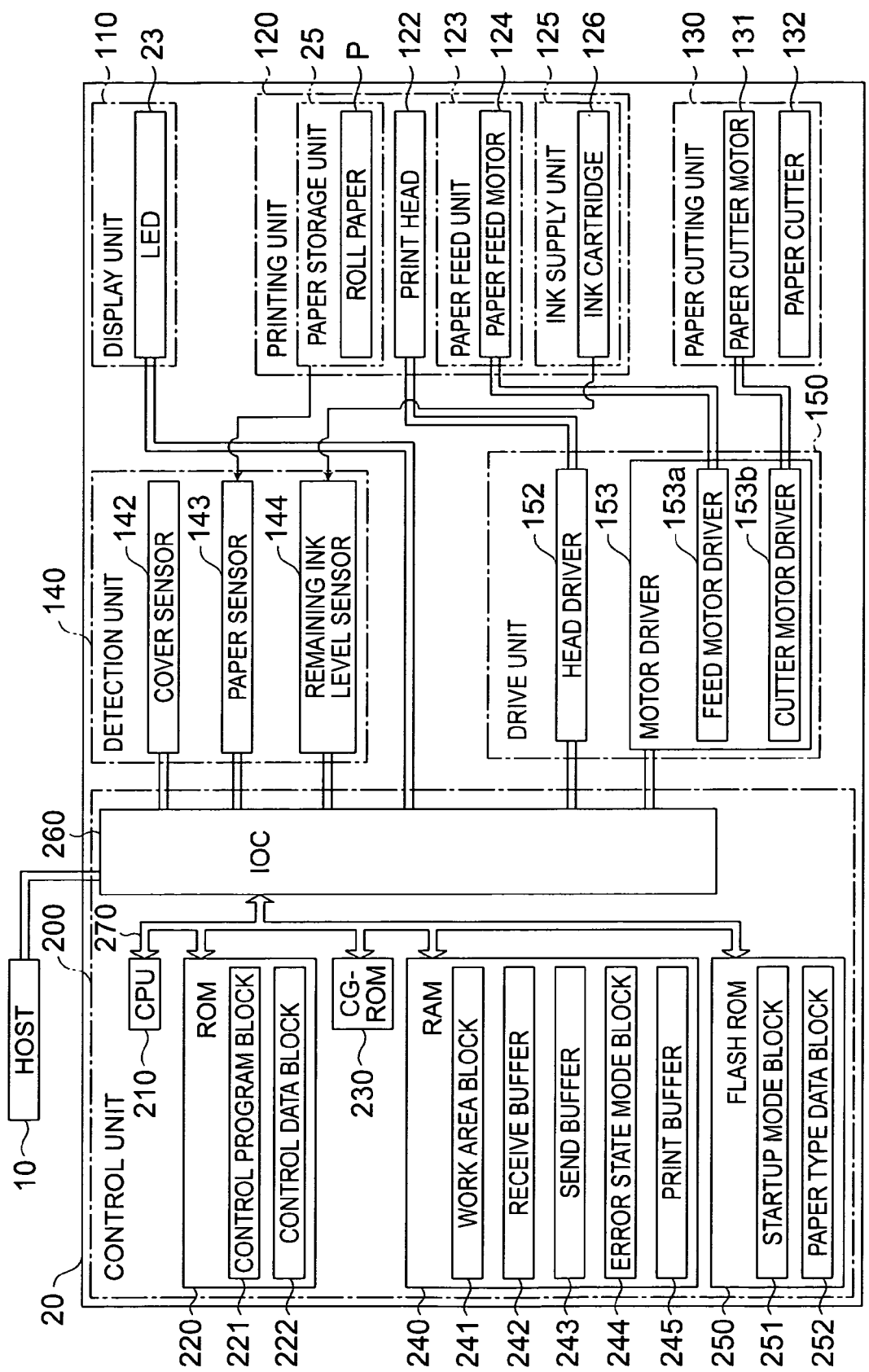
FIG. 4 is a control block diagram showing a control configuration of the printer.

As shown in FIGS. 3 and 4, the printer 20 has an interface 41 for data communication with the host 10; a data receiving unit 42 that functions as a receive buffer 242 for storing received print data and control commands; a processing mode evaluation unit 43 for determining the processing mode based on resume_printing commands received from the host 10 and printer error detection, and passing control to the normal processing mode controller 44 or deletion processing mode controller 45 (described below) according to the identified processing mode; a normal processing mode controller 44 for controlling the printer 20 when the normal processing mode is selected by the processing mode evaluation unit 43; a deletion processing mode controller 45 for controlling the printer when the deletion processing mode is selected by the processing mode evaluation unit 43; a selected mode memory 46 for storing the setting (command) from the host 10 that determines the processing mode to be executed when an error occurs; a status monitoring unit 47 having an error detection unit 47a for detecting if there is an error in the printer 20 and identifying the cause of the error by detecting the state of a cover sensor 142, a paper sensor 143, and a remaining ink level sensor 144, and monitoring whether the printer 20 can continue printing; a print controller 48 functioning as a print buffer 245 for storing image data based on print data sent from the host 10, and controlling printing; a status/response generator 49 for generating the status and response data sent to the host 10; and a data transmission unit 50 functioning as a transmission buffer 243 for storing data to be sent to the host 10, including the status and response data generated by the status/response generator 49.

The normal processing mode controller 44 processes print data and commands received from the host 10 when the status of the printer 20 is normal (that is, in the normal processing mode capable of executing the printing process normally). If a resume_printing command is received during normal processing mode control, the normal processing mode controller 44 discards the resume_printing command. If a problem occurs in the printer 20, the process mode evaluation unit 43 has identified the processing mode that was previously set to handle the cause of the particular problem, and the cause of the problem is one that causes the deletion processing mode to be selected, the normal processing mode controller 44 passes control to the deletion processing mode controller 45.

When operation passes to the deletion processing mode, the deletion processing mode controller 45 sends a start_deletion_process response to the host 10. When a resume_printing command is received from the host 10, the deletion processing mode controller 45 returns an end_deletion_process response and passes control back to the normal processing mode controller 44. The deletion processing mode controller 45 executes only specific commands intended for execution in the deletion processing mode, and deletes any other commands or print data received. The specific commands executed by the deletion processing mode controller 45 include the resume_printing command, processing mode inquiry (whether the current processing mode is the normal processing mode or the deletion processing mode) commands, and printer status request command.

The status/response generator 49 generates the ASB status report for reporting the printer status detected by the status monitoring unit 47, and various responses reporting the data processing state. These responses include the process ID response, start_deletion_process response, and end_deletion_process response.

As shown in FIG. 4 the printer 20 has a display unit 110 including LEDs 23 for indicating errors in the printer 20, a printing unit 120, a paper cutting unit 130, a detection unit 140, a drive unit 150, and a control unit 200 connected to these other units and controlling the printer 20.

The printing unit 120 includes the print head 122, a paper feed unit 123 for conveying the roll paper P by means of a paper feed motor 124, and the ink supply unit 125 for supplying ink from an ink cartridge 126, and prints according to print data sent from the host 10.

The paper cutting unit 130 has a paper cutter 132 and a paper cutter motor 131 for driving the paper cutter 132, and cuts the roll paper P at a point trailing the printed area.

The detection unit 140 includes a cover sensor 142 for detecting if the cover 22 is open or closed, a paper sensor 143 that detects if there is any roll paper P in the paper storage unit 25, and a remaining ink level sensor 144 that detects how much ink is left in the ink cartridge 126.

The drive unit 150 includes a head driver 152 and a motor driver 153 (feed motor driver 153a and cutter motor driver 153b), and controls driving each.

The control unit 200 includes a CPU 210, a ROM 220, a character generator ROM (CG-ROM) 230, a RAM 240, a flash ROM 250, and an input/output controller (IOC) 260 connected via an internal bus 270. ROM 220 has a control program block 221 for storing a program for controlling operation in each of the processing modes and programs executed by the CPU 210, and a control data block 222 for storing data tables and control data. The CG-ROM 230 stores character and symbol font data, and outputs the corresponding font data when the character code for a desired character or symbol is received. The CG-ROM 230 can be omitted depending on the processing capacity of the host 10.

RAM 240 is working memory and includes a work area block 241 used for storing flags, for example; a receive buffer 242 that functions as the data receiving unit 42 for storing print data and commands received from the host 10; a send buffer 243 that functions as the data transmission unit 50 for storing status and response data for sending to the host 10; an error state mode block 244 that functions as selected mode memory 46 for storing the value set by the error state mode selection command (see FIG. 5A); and print buffer 245 for storing image data for printing.

The flash ROM 250 has a startup mode block 251 that functions as selected mode memory 46 for storing the startup mode selection command setting, and a paper type data block 252 for storing data identifying the type of paper identified by the detection result from the paper sensor 143. The startup mode selection command controls whether the printer 20 starts from the normal processing mode or from the deletion processing mode. The type of paper includes continuous form (roll paper), slip, and special-purpose paper. Note, further, that the invention is not limited to setting the paper type based on the detection result from the paper sensor 143, and could be set by a DIP switch on the printer 20 or control data sent from the host 10.

The IOC 260 has logic circuits composed of a gate array, custom LSI device, or other device for complementing CPU function and handling interface signals exchanged with peripheral circuits. The IOC 260 can pass print data and control data from the host 10 directly or after internal processing to the internal bus 270.

The CPU 210 takes signals and data from other parts of the printer 20 or from the host 10 through IOC 260, processes font data from the CG-ROM 230 and data in RAM 240 according to the control program stored in ROM 220, and then outputs signals and data to other parts of the printer 20 through IOC 260 to control mode selection and printing processes according to control commands sent from the host 10.

Some control commands sent from the host 10 to the printer 20 are described next with reference to FIG. 5A to FIG. 5C. As shown in FIG. 5A, the error state mode selection command ESC A m1 m2 m3 determines what process to run when an error occurs.

If m1=0 (first error state mode; also referred to as the first processing mode), the process mode evaluation unit 43 does not activate the deletion processing mode when an error occurs. In this case, data that has not been printed yet and is still stored in receive buffer 242 and print buffer 245 is kept.

If m1=1 (second error state mode; also referred to as the second processing mode) when an error occurs, the process mode evaluation unit 43 selects the deletion processing mode and passes control to the deletion processing mode controller 45. The deletion processing mode controller 45 then clears receive buffer 242 and print buffer 245 of any data that has not been printed yet and is still in memory, and then enters the deletion processing mode.

If m1=2 (third error state mode), the process mode evaluation unit 43 selects the deletion processing mode when an error occurs and thus passes control to the deletion processing mode controller 45. The deletion processing mode controller 45 clears the print buffer 245 of any data that has not been printed yet and is still stored in print buffer 245, but does not erase data that has not been printed and is still stored in receive buffer 242, and then enters the deletion processing mode.

It is therefore possible by changing the value of parameter m1 to select the processing mode that is used to handle a particular type of error. More specifically, selecting the first error state mode (m1=0) enables printing the data following the data that was processed before the error occurred continuously after the data that was printed before the error occurred once the problem causing the error is corrected, and thus results in a continuous printout. This is useful with ink end errors and other errors that are caused by problems that do not separate the printout onto separate pieces of paper when the error occurs. In this mode it is therefore not necessary to send the print data again, and paper and ink waste can be prevented.

Furthermore, if the second error state mode (m1=1) is selected, all data in the receive buffer 242 and print buffer 245 is cleared, and less time is required to clear the data buffers in the deletion processing mode. Furthermore, if an application that monitors the printer status is used, processing can be controlled while monitoring the printer status, and processing can be continued with no problem by sending a resume_printing command after a status report indicating the problem was corrected is received.

If the third error state mode (m1=2) is selected, the deletion processing mode is activated while retaining the data in the receive buffer 242, and the data in the receive buffer 242 is checked and deleted one byte at a time in the deletion processing mode. As a result, if a resume_printing command is contained in the data that was not stopped by the data transmission interrupt process of the host 10 when an error occurred or the data that was already sent, the normal processing mode can be resumed by the resume_printing command when the cause of the error is corrected on the printer 20. Note that this already sent data includes data in the transmission buffer managed by the OS of the host 10, data in the data buffer of the POS server 30, and data in the receive buffer 242 of the printer 20. Because correction of the cause of the error in the printer 20 can thus be detected and the normal processing mode can be resumed without requiring transmission of a resume_printing command from the host 10, the host 10 application can resume processing with no problem even if the application does not monitor the printer status. It should be noted that because the deletion process of verifying and deleting data in the receive buffer 242 one byte at a time is time-consuming, the second processing mode (m1=1) is preferably selected when using an application that monitors the printer 20 status.

Parameter m2 is described next. Parameter m2 of the error state mode selection command ESC A m1 m2 m3 specifies whether to send a response to the host 10 when the processing mode changes. If m2=0, a response is not sent to the host 10 when the processing mode changes. If m2=1, the deletion processing mode controller 45 causes the status/response generator 49 to generate and send the start_deletion_process response to the host 10 when the processing mode changes from the normal processing mode to the deletion processing mode, and the normal processing mode controller 44 causes the status/response generator 49 to generate and send the end_deletion_process response to the host 10 when operation changes from the deletion processing mode to the normal processing mode.

By thus sending the start_deletion_process and end_deletion_process responses from the printer 20, the host 10 can know the current processing mode of the printer 20. The end_deletion_process response also confirms that the resume_printing command was processed normally.

Furthermore, because it is possible to elect whether to send a response to the host 10 when the processing mode changes, compatibility with host 10 applications that do not monitor the printer 20 status is possible by setting the parameter so that neither response is sent (that is, m2=0).

Parameter m3 is described next. Parameter m3 of the error state mode selection command ESC A m1 m2 m3 specifies the causes of errors corresponding to the processing modes specified by parameter m1. If parameter m3=0, the processing mode specified by parameter m1 of this error state mode selection command handles all errors regardless of the cause of the error. Setting parameter m3=0 in a printer that can use the same process to handle all errors regardless of the cause of the error reduces the load on the application. Furthermore, by initially setting parameter m3=0 to handle all errors by the same process and then resetting the processing mode individually for those error causes that must be handled by a different processing mode, the application can select the error handling mode more efficiently in a printer that changes the processing mode according to the cause of the error that occurred.

A cutter error (m3=10) indicates a problem with the paper cutter 132 mechanism, such as the paper cutter 132 being unable to cut the paper because the paper cutter 132 does not return to the home position. A carriage operating error (m3=11) indicates a problem with the carriage mechanism, such as printing not being possible because the carriage on which the print head 122 is mounted cannot slide. Data printed before these errors occur may not have been printed correctly, and it is therefore desirable to reprint the previously printed portion once the problem is corrected and the normal processing mode is resumed.

A cover A open error (m3=20) or cover B open error (m3=21) indicates that cover A or cover B, respectively, is open. Cover A is, for example, the ink cartridge 126 compartment cover (not shown in the figure), and printing stops if cover A opens. When printing stops, the state of the paper and print head when printing stopped is either maintained or stored in memory. The unprinted data is then printed continuously to the already printing portion when cover A closes, and the desired printout can thus be achieved.

Cover B is the cover 22 to the paper storage unit 25, for example. If the printer is constructed such that the paper cannot be held if cover B is open, then the paper will shift when cover B opens and will not be the same as before cover B opened when the cover B is closed again. Therefore, if printing stops when cover B opens and printing the unprinted data resumes when the cover is closed, the portion printed before the cover opened and the portion printed when printing resumes will likely not be continuous or correctly aligned. It is therefore preferable in this case to reprint the portion that was printed before the cover opened.

A no_paper error (paper supply depleted error) (m3=30) indicates that the paper has run out. This problem is resolved by loading new paper after printing stops. If the paper is roll paper P, printing cannot be resumed continuously to the previously printed portion after loading roll paper P by resuming printing of only the unprinted data. It is therefore preferable in this case to also reprint the previously printed portion after replenishing the roll paper P supply. If slip paper is used instead of roll paper P, however, the no_paper error is again corrected by adding paper after printing stops. In this case, however, the desired printout can be achieved by printing only the unprinted data using the replenished paper supply.

A no_ink (ink supply depleted) error (m3=40) indicates that there is no ink to be supplied to the print head 122. If printing stops because of a no_ink error, the state of the paper and print head when printing stopped is either maintained or stored in memory. The unprinted data is then printed continuously to the already printing portion when the ink cartridge is replaced, and the desired printout can thus be achieved.

Instead of selecting the processing mode to be activated when an error occurs, selecting whether to send a response when the processing mode changes, and selecting the causes of the errors to which the selected process is applied by means of a command such as described above, it is alternatively possible to provide memory switches in the printer 20. In this case control data for resetting the appropriate memory switch can be sent from the host 10 to make the corresponding selections. The printer 20 could further alternatively be provided with DIP switches which are then set to make the corresponding selections. Furthermore, if it is not necessary to change parameters m1 to m3, the corresponding settings (or data corresponding to these settings) can be preset and stored in flash ROM 250 or other nonvolatile storage device.

The resume_printing command is described next with reference to FIG. 5B. As described above, the resume_printing command tells the printer to leave the deletion processing mode and resume the normal processing mode, and is represented by ESC B d1 . . . dk in this embodiment of the invention where d1 . . . dk is a character string such as FINISH or other desirable keyword or value. This keyword or value is stored in flash ROM 250 in the printer 20. By using a desirable keyword as the parameter, operating errors due to an accidental match can be avoided.

In addition, when using an application that monitors the printer status, the application can manage returning to the normal processing mode by sending the resume_printing command at the appropriate time, and data that have not been printed can be reliably deleted. Furthermore, if the application does not monitor the printer 20 status, printing can be resumed from the page following the page that was being processed when the error occurred by adding the resume_printing command to the beginning of the print data. Yet further, by adding the resume_printing command immediately before command data that is to be unconditionally executed, such as a command to cut the roll paper P or a command to discharge the paper if slips are used as the printing medium, those commands can be reliably executed.

The processing mode inquiry command is described next with reference to FIG. 5C. The processing mode inquiry command ESC C m is used to confirm the current processing mode of the printer 20. Parameter m could be set to m=1, for example. By sending this processing mode inquiry command before sending print data, for example, the host 10 can confirm the processing mode of the printer 20 and send data appropriate to the current processing mode. This prevents sending print data when the printer 20 is in the deletion processing mode and the resulting loss of the print data, for example. Furthermore, if the printer 20 has entered the deletion processing mode before the host 10 application starts, the application might not receive the start_deletion_process response. However, by using this processing mode inquiry command, the application can determine if the printer 20 is in the deletion processing mode.

The printer 20 sends the start_deletion_process response or end_deletion_process response when queried by this processing mode inquiry command ESC C m. That is, if the printer 20 is in the deletion processing mode, it sends the start_deletion_process response, but if the printer 20 is in the normal processing mode, it sends the end_deletion_process response. By returning the same responses that are sent when the processing mode changes, the host 10 can use the same tasks and control processes appropriate to the processing mode.

Operation of the printer 20 when using an application that monitors the printer status is described next below with reference to the flow charts in FIGS. 6-8.

Figure 6:
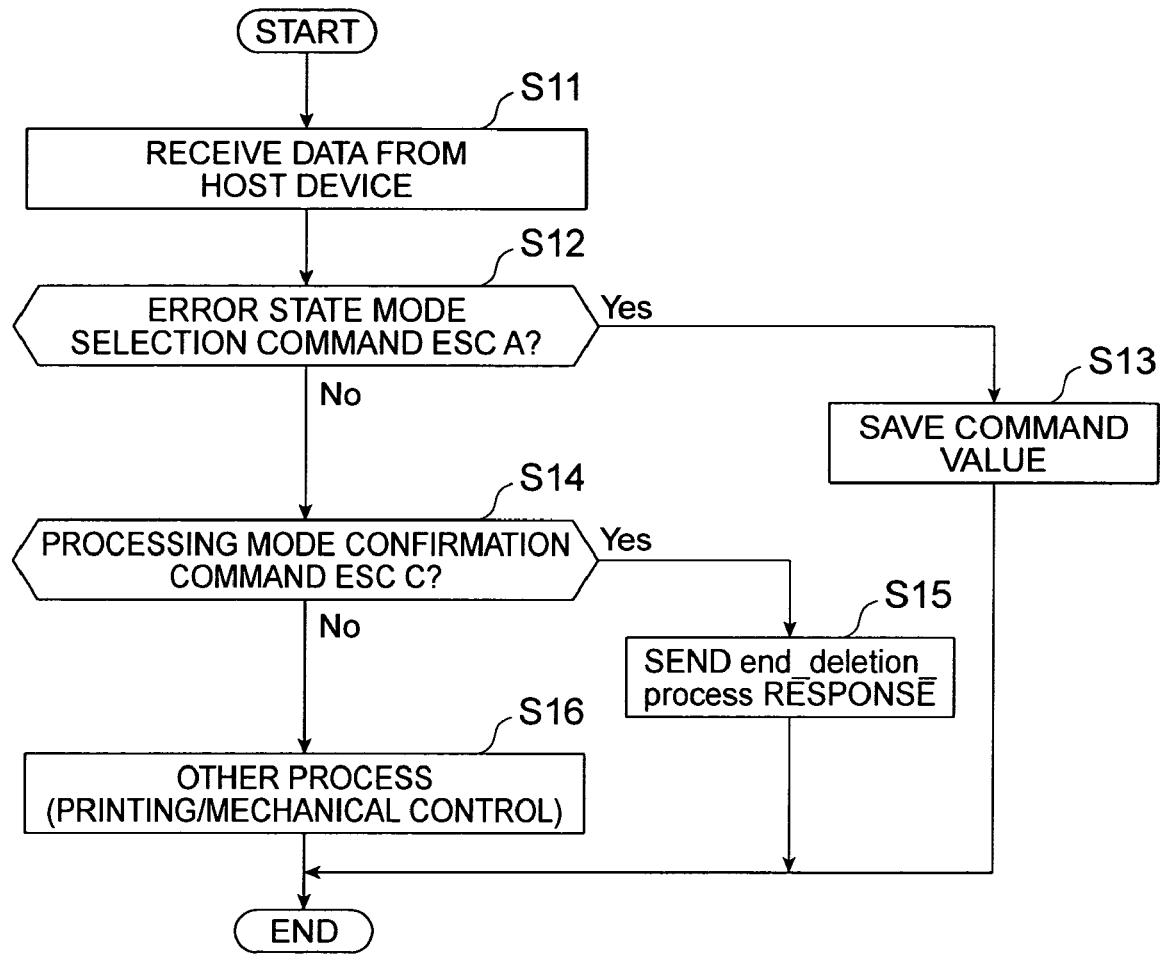
FIG. 6 is a flow chart of normal data processing by the printer when the host application monitors printer status, according to one embodiment of the invention.

Operation of the printer 20 during normal data processing, that is, in the normal processing mode, is described first with reference to FIG. 6. As shown in FIG. 6, when the printer 20 receives data from the host 10 (S11), it determines if the error state mode selection command (ESC A) was sent (S12). If it was (S12 returns Yes), the command parameters m1, m2, m3 are stored in error state mode block 244 (S13).

The values of parameter m1 and parameter m2 for each cause of error declared by parameter m3 are stored at this time. If a parameter value is already stored in the error state mode block 244 when the parameter value is received and the received value is the same as the previously stored value, the received value is not written to the error state mode block 244 and the previously stored value is kept. If the error state mode block 244 is flash memory or other type of storage device that can deteriorate with repeated writing, that is, can only be written a certain number of times, omitting unnecessary writing operations slows this deterioration and thus increases the usable life of the memory. Furthermore, if the host application monitors the printer 20 status as in this example, parameter m2 is preferably always set to m2=1 (to send the mode transition response) regardless of the cause of the error.

If the error state mode selection command was not received (S12 returns No), the printer 20 determines whether the processing mode inquiry command (ESC C) was received (S14). If it was (S14 returns Yes), the end_deletion_process response is returned to the host 10 because the normal processing mode is currently active (S15), thus telling the host 10 that the printer 20 is in the normal processing mode. If the processing mode inquiry command was not received (S14 returns No), the received data is processed accordingly for printing control or mechanical control, for example (S16).

While not shown in the figure, it should be noted that if a resume_printing command is sent while the printer is in the normal processing mode due to an operator error, for example, the resume_printing command is deleted upon receipt.

Operation of the printer 20 when an error occurs and and when the deletion processing mode runs is described next with reference to FIGS. 7 and 8.

Figure 7:
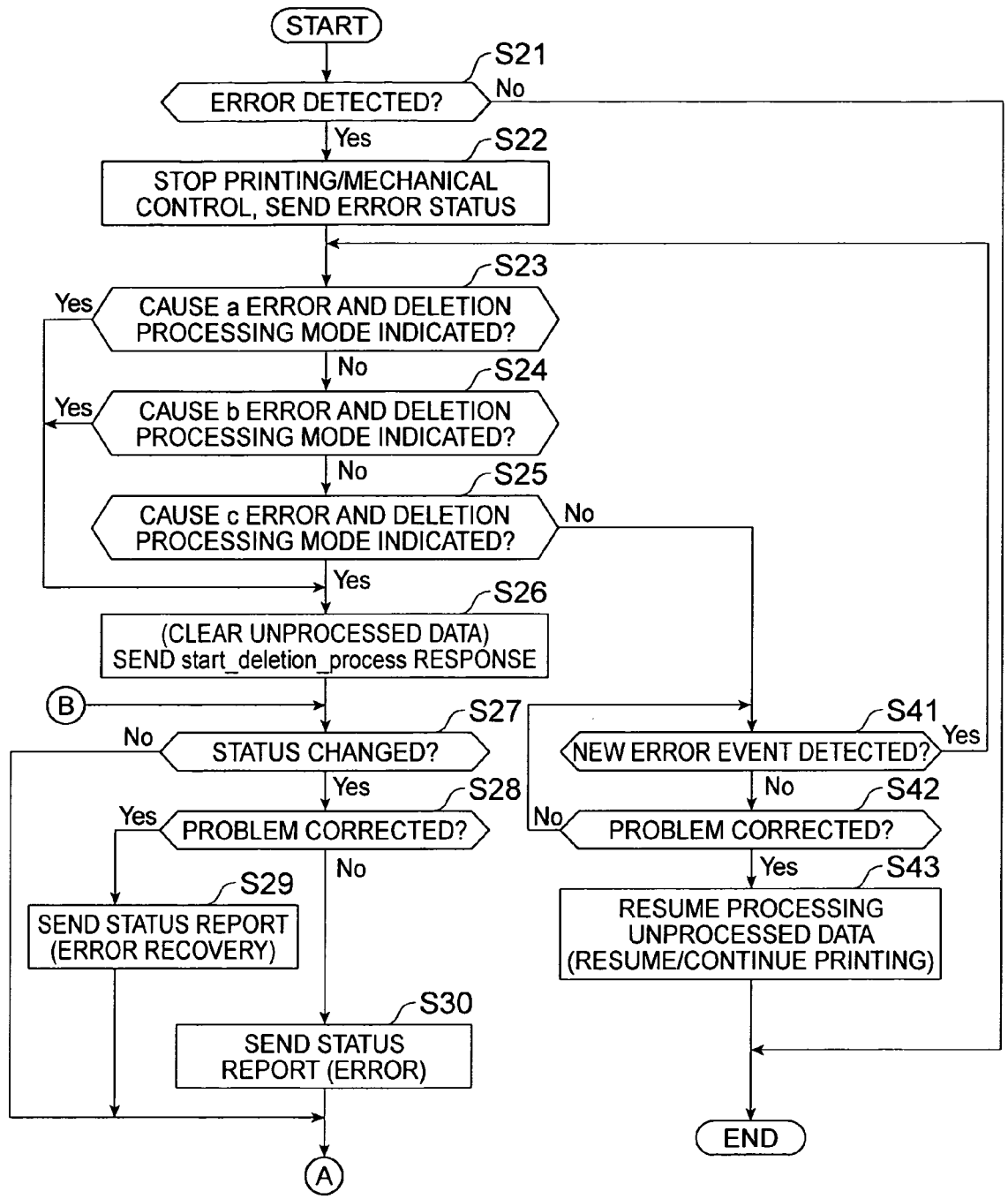
FIGS. 7 and 8 show a flow chart of processing by the printer when an error occurs and the host application monitors printer status, according to one embodiment of the invention.

Referring to FIG. 7, when the error detection unit 47a of the printer 20 detects an error (such as a paper jam, open cover, no paper, or no ink) (S21 returns Yes), the printer 20 stops printing and mechanical operations, and sends an error status report to the host 10 (S22). For brevity, this embodiment of the invention assumes there are three possible causes of an error: cover A is open (cause a), no paper (cause b), and no ink (cause c).

The printer 20 then decides if the cause of the error is cause a, and if it is whether the deletion processing mode is to be executed, that is, whether the parameter m1 setting for cause a is m1=1 or 2 (S23). If the cause of the error is not cause a or if the deletion processing mode is not selected (m1=0) (S23 returns No), whether the cause of the error is cause b and if the deletion processing mode is to be executed when the cause is cause b is determined (S24). If the cause is not cause b or the deletion processing mode is not set for execution (S24 returns No), whether the cause of the error is cause c and if the deletion processing mode is to be executed when the cause is cause c is determined (S25).

If the cause of the error is not cause c or the deletion processing mode is not set for execution (S25 returns No), whether the error is due to a new cause is determined (S41). If an error due to a new event has occurred (S41 returns Yes), control returns to step S23 and steps S23 to S25 repeat. By executing this step S41, the appropriate process can be executed for an error caused by a new event that occurred between determining the cause of the error and determining whether to execute the deletion processing mode.

For example, if step S25 returns No, the printer 20 will not enter the deletion processing mode, but if an error due to cause a or cause b occurred before step S25 decided no and the deletion processing mode is set to execute for cause a or cause b, the error caused by the newly occurring cause a or cause b event will not be appropriately processed. Executing step S41, however, enables determining the cause of the error and whether the deletion processing mode is set for an error caused by a new event, and enables handling the error appropriately.

If an error caused by a new event has not occurred (S41 returns No), whether the problem has been resolved is determined (S42). If the problem is unresolved (S42 returns No), control loops back to step S41. When the problem is resolved (S42 returns Yes), processing the unprocessed data (the data for which printing is not completed) resumes (S43) and the error handling process ends. Because the unprocessed data is not discarded when an error occurs in this case (i.e., the data is retained in memory), printing continues from where printing stopped when the error occurred.

If the cause of the error is cause a, cause b, or cause c and the deletion processing mode is set to be executed for the cause (any of steps S23 to S25 returns Yes), the deletion processing mode is activated (S26). If m1=1, the deletion processing mode is activated after the unprocessed data in the receive buffer 242 and the unprocssed image data in the print buffer 245 is discarded. If m1=2, the unprocessed image data in the print buffer 245 is discarded while the unprocessed data in the receive buffer 242 is kept and the deletion processing mode is then activated. Furthermore, if a response is to be sent when the processing mode changes (m2=1), the start_deletion_process response is sent to the host 10 and the deletion processing mode is activated. If a response is not set to be sent when the processing mode changes (m2=0), the deletion processing mode is activated without sending the start_deletion_process response.

If there was a change in the printer status is then detected (S27). If a change is detected (S27 returns Yes), whether the change was a resolution of the error (problem) is detected (S28). If the error was corrected (S28 returns Yes), the error recovery status is sent to the host 10 (S29). However, if the change was that an error was detected (S28 returns No), the error status is sent to the host 10 (S30).

Figure 8:
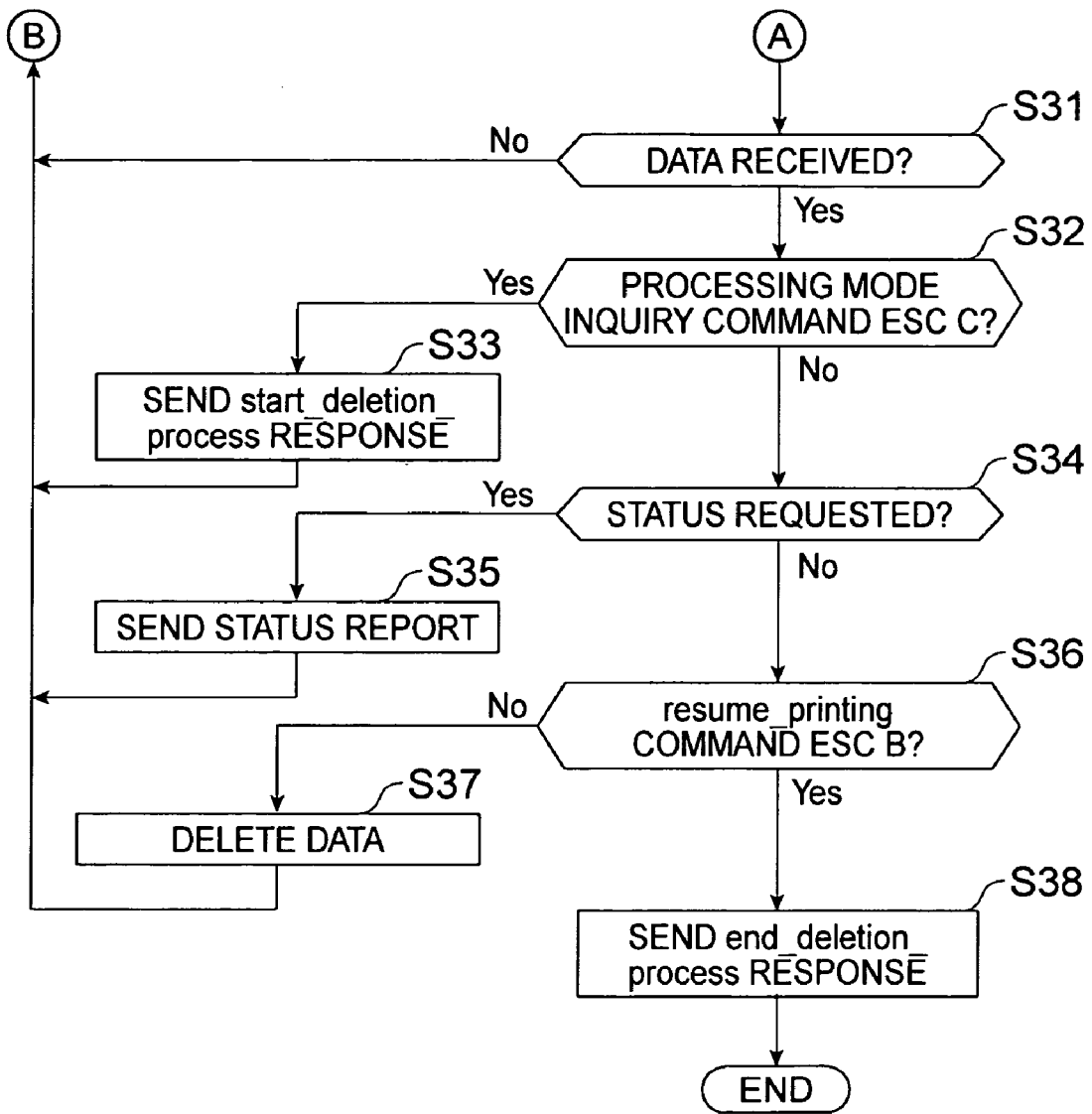

After the error recovery or error status is sent (S29 or S30), or if there is no state changed detected (S27 returns No), the printer 20 detects if there is any data from the host 10 in the received buffer 242 (S31) as shown in FIG. 8. Referring now to FIG. 8, if data was received from the host 10 (S31 returns Yes), whether a processing mode inquiry command (ESC C) was received is determined (S32). If a processing mode inquiry command was received (S32 returns Yes), the printer 20 returns the start_deletion_process response because the deletion processing mode is currently active (S33).

If the processing mode inquiry command was not received (S32 returns No), whether a status request command was received is determined (S34). If it was (S34 returns Yes), the printer status is returned (S35).

If the status was not requested (S34 returns No), whether the resume_printing command ESC B was received is detected (S36). If the resume_printing command was not received (S36 returns No), the received data is discarded (S37). If the resume_printing command was received (S36 returns Yes), the end_deletion_process response is returned (S38, unless m2=0, in which case no response is returned). The deletion processing mode is then terminated and the normal processing mode resumed.

It should be noted that the step of discarding the unprocessed data in step S26 above is not limited to execution before entering the deletion processing mode, and can be executed anytime during the transition to the deletion processing mode or during the deletion processing mode, including just after entering the deletion processing mode or after detecting that the problem has been resolved (step S28).

Because commands other than the specific commands described above (the processing mode inquiry command, status request command, and resume_printing command) are thus ignored when the printer is in the deletion processing mode, unprocessed data (data that the host 10 wants to delete) can be reliably deleted by activating the deletion processing mode by asserting the error state mode selection command with the corresponding parameters.

If the cause of the error (error state) has not been resolved when the resume_printing command is received and the normal processing mode is resumed, the persistence of the error will be detected by the first error detection step (S21 returns Yes) and the process executed when an error occurs will be executed again as described above. This assures reliable error recovery by the printer 20. From responses received from the printer, the host 10 is able to know if the error (problem) persists and can confirm that the resume_printing command was processed normally.

Furthermore, if the operator can manually assert the resume_printing command, the resume_printing command could be asserted erroneously due to an operator error even though the problem causing the error has not been corrected. If the printer 20 is unable to send a response in such cases, previous start_deletion_process or end_deletion_process responses may remain unsent in the printer's send buffer 243. Responses could similarly accumulate if receiving responses and sending the processing mode inquiry command are started by different tasks. If the deletion processing mode is thus resumed when both previous responses remain in the send buffer 243 and the end_deletion_process response is unsent, both past responses are deleted and only the most recent start_deletion_process response is sent. This prevents sending previous start_deletion_process and end_deletion_ process responses accumulated in the send buffer 243 to the host one right after the other. Therefore, the controller (CPU, for example) will not be overloaded by receiving multiple consecutive responses even when using an application that monitors the printer status infrequently.

Operation of the host 10 when using an application that monitors the status of the printer 20 is described next with reference to the flow chart in FIG. 9.

Figure 9:
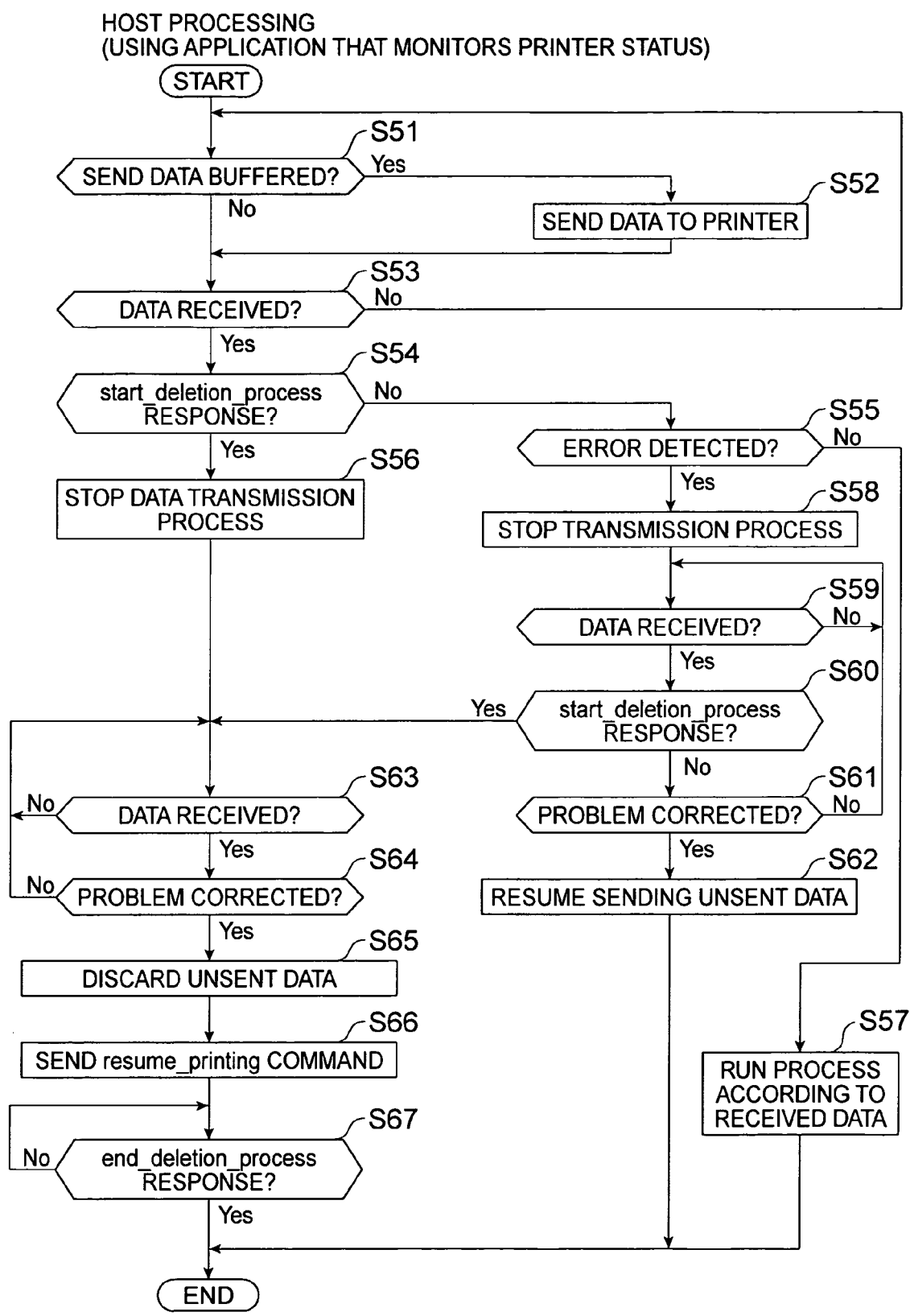
FIG. 9 is a flow chart showing processing by the host device when a printer error occurs and the host application monitors the printer status, according to one embodiment of the invention.

As shown in FIG. 9, the host 10 detects if there is data to send to the printer 20 (S51), and if there is (S51 returns Yes), runs the data transmission process to send the data to the printer 20 (S52). The host 10 then detects if data was received from the printer 20 (S53), and if data was received (S53 returns Yes), determines if the start_deletion_process response was received (S54). If the start_deletion_process response was not received (S54 returns No), whether the received data was an error status report is determined, that is, whether an error occurred in the printer 20 is determined (S55). If an error status report was not received (S55 returns No), a process appropriate to the received data is run (S57) and operation then ends.

However, if the start_deletion_process response was received (S54 returns Yes), the host 10 knows that the printer 20 is in the deletion processing mode, and the host 10 therefore stops the data transmission process (S56).

When the data transmission process stops (S56), the host 10 determines if data was received from the printer 20 (S63). If data was not received (S63 returns No), the host 10 waits to receive data. If data was received from the printer (S63 returns Yes), the host 10 determines if an error recovery report was received (S64). If an error recovery report was not received (S64 returns No), the host 10 waits to receive data. If an error recovery report was received (S64 returns Yes), the unsent data is discarded (S65) and a resume_printing command is sent (S66). Whether an end_deletion_process response is received in response to the resume_printing command is then determined (S67). if an end_deletion_process response is not received (S67 returns No), the host 10 waits until the end_deletion_process response is received. Receiving an end_deletion_process response (S67 returns Yes) enables the host 10 to know that the printer 20 resumed the normal processing mode and thus ends the error handling process.

If the received data was an error status report (S55 returns Yes), the host 10 knows that there is a problem in the printer 20 and therefore stops the data transmission process (S58).

When the data transmission process stops (S58), the host 10 determines if data was received from the printer 20 (S59). If data was not received (S59 returns No), the host 10 waits to receive data. If data was received from the printer (S59 returns Yes), the host 10 determines if a start_deletion_process response was received (S60). If the received data was a start_ deletion_process response (S60 returns Yes), the host 10 knows that the printer 20 entered the deletion processing mode, therefore skips to step S63 and runs steps S63 to S67 as described above.

If the received data was not a start_deletion_process response (S60 returns No), whether an error recovery report was received is determined (S61). If an error recovery report was not received (S61 returns No), the host 10 waits for data (S59). If an error recovery report was received (S61 returns Yes), transmitting the unsent data remaining in the buffer resumes (S62), and the error handling process ends.

When the process ends after a start_deletion_process response is received, data transmission preferably resumes from the beginning of the data for which transmission was interrupted when the error occurred.

Operation of the printer 20 with an application that does not monitor the status of the printer 20 is described next with reference to the flow charts in FIG. 10 and FIG. 11.

While certain inconsistencies arise with the description of the host 10 and printer 20 in FIG. 2 to FIG. 4 in that the printer status is not monitored, other than that status and response information is not sent from the printer 20, and the resume_ printing command is inserted to the data (print data and command data) generated by the application, operation is the same as when the printer status is monitored. Further description of control similar to FIG. 2 to FIG. 4 is therefore omitted below.

Figure 10:
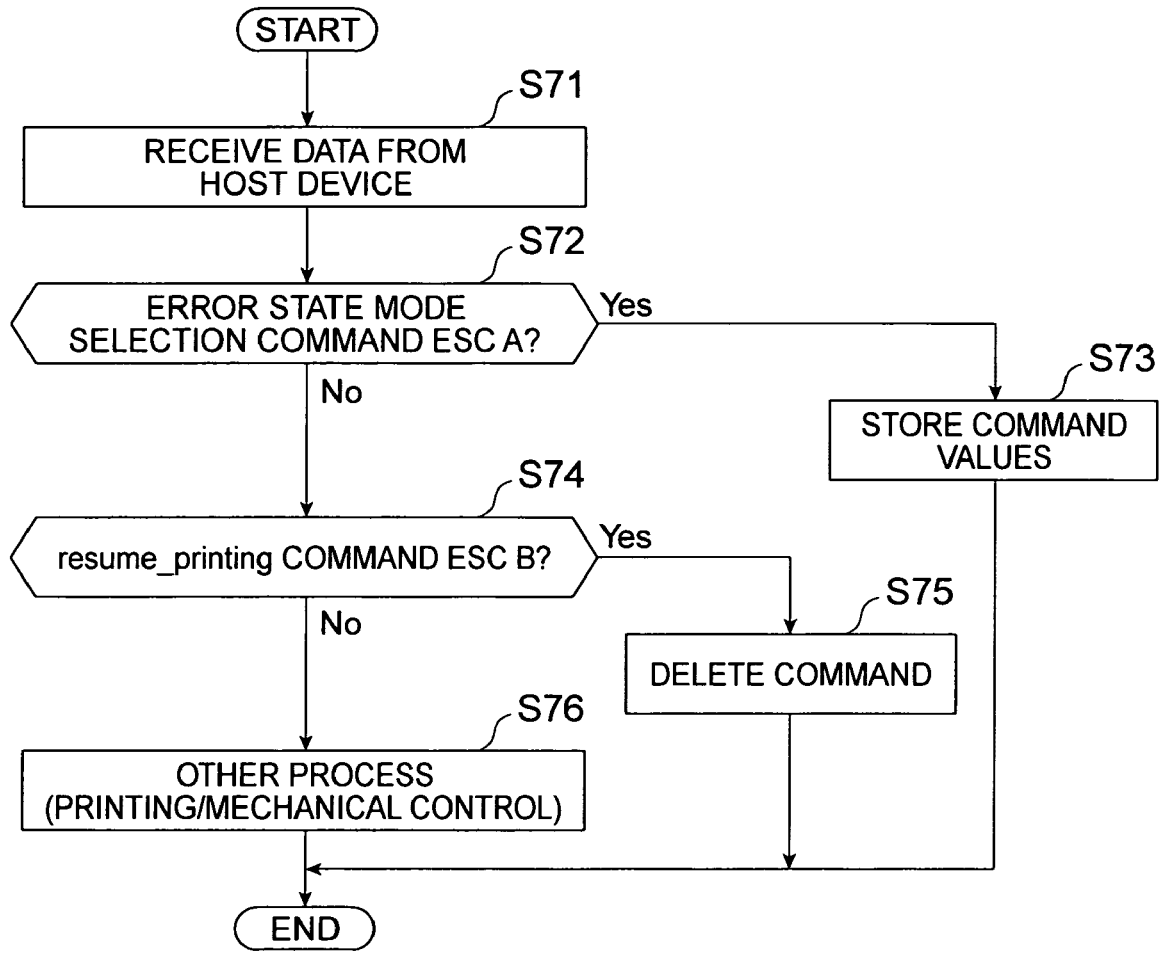
FIG. 10 is a flow chart of normal data processing by the printer when the host application does not monitor the printer status, according to one embodiment of the invention.

Processing by the printer 20 during normal data processing (i.e., in the normal processing mode) is described first with reference to FIG. 10. When the printer 20 receives data from the host 10 (S71), the printer 20 determines if the error state mode selection command (ESC A) was received (S72). If this command was received (S72 returns Yes), the printer 20 stores the command parameters m1, m2, m3 in error state mode block 244 (S73). As described above, parameter m3 is the parameter specifying the cause of the error, and the values of parameters m1 and m2 are stored for each cause specified by parameter m3. When using an application that does not monitor printer status, as in the case shown in FIG. 10, command parameter m2 is preferably always set to m2=0 (so that a mode change response is not sent) regardless of the cause of the error.

If the error state mode selection command was not received (S72 returns No), the printer 20 determines whether the resume_printing command [ESC B] was received (S74). If the resume_printing command was received (S74 returns Yes), the resume_Printing command is deleted (S75). If the received data was also not a resume_printing command (S74 returns No), the process appropriate to the received data is run (S76).

It will thus be apparent that the printer discards the resume_ printing command when operating in the normal processing mode and can thus print normally even if the resume_printing command is embedded in the data sent to the printer when using an application that does not monitor the printer 20 status.

Processing by the printer 20 when it is in the deletion processing mode and an error occurs is described next with reference to FIG. 11.

Figure 11:
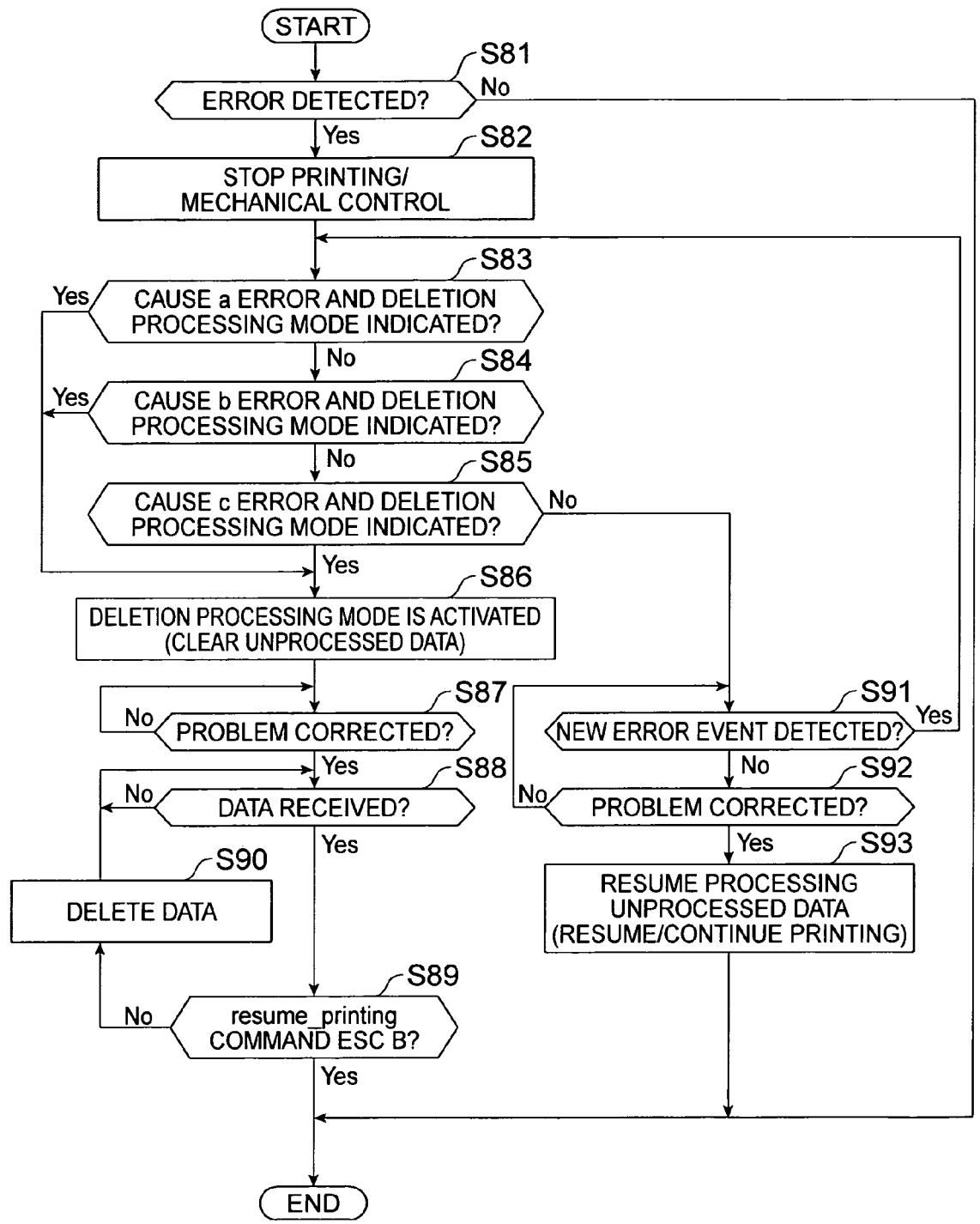
FIG. 11 is a flow chart of data processing by the printer when an error occurs and the host application does not monitor the printer status, according to one embodiment of the invention.

As shown in FIG. 11, when the error detection unit 47a of the printer 20 detects an error (including a paper jam, open cover, no paper, or no ink, for example) (S81 returns Yes), it stops printing control and mechanical control (S82). For brevity, this embodiment of the invention assumes there are three possible causes of an error: cover A is open (cause a), no paper (cause b), and no ink (cause c).

The printer 20 then decides if the cause of the error is cause a, and if it is whether the deletion processing mode is to be executed, that is, whether the parameter m1 setting for cause a is m1=1 or 2 (S83). If the cause of the error is not cause a or if the deletion processing mode is not selected (m1=0) (S83 returns No), whether the cause of the error is cause b and if the deletion processing mode is to be executed when the cause is cause b is determined (S84). If the cause is not cause b or the deletion processing mode is not set for execution (S84 returns No), whether the cause of the error is cause c and if the deletion processing mode is to be executed when the cause is cause c is determined (S85).

If the cause of the error is not cause c or the deletion processing mode is not set for execution (S85 returns No), whether the error is due to a new cause is determined (S91). If an error due to a new event has occurred (S91 returns Yes), control returns to step S83 and steps S83 to S85 repeat. By executing this step S91, the appropriate process can be executed for an error caused by a new event that occurred between determining the cause of the error and determining whether to execute the deletion processing mode.

If an error caused by a new event has not occurred (S91 returns No), whether the problem has been resolved is determined (S92). If the problem is unresolved (S92 returns No), control loops back to step S91. When the problem is resolved (S92 returns Yes), processing the unprocessed data (the data for which printing is not completed) resumes (S93). Because the unprocessed data is not discarded when an error occurs in this case (i.e., the data is retained in memory), printing continues from where printing stopped when the error occurred.

If the cause of the error is cause a, cause b, or cause c and the deletion processing mode is set to be executed for the cause (any of steps S83 to S85 returns Yes), the deletion processing mode is activated (S86). If m1=1, the deletion processing mode is activated (S86) after the unprocessed data in the receive buffer 242 and the unprocssed image data in the print buffer 245 is discarded. If m1=2, the unprocessed image data in the print buffer 245 is discarded while the unprocessed data in the receive buffer 242 is kept and the deletion processing mode is then activated (S86).

Whether the cause of the error has been resolved is then determined (S87). If the error has not been corrected (S87 returns No), the printer 20 waits for the problem to be resolved. If the error has been corrected (S87 returns Yes), the printer 20 determines if data has been received from the host 10 (S88). If data was received (S88 returns Yes), whether the received data is a resume_printing command is determined (S89). If a resume_printing command was not received (S89 returns No), the data is discarded (S90). If a resume_printing command was received (S89 returns Yes), the deletion processing mode is terminated and the normal processing mode is resumed.

It should be noted that the step of discarding the unprocessed data in step S86 above is not limited to execution before entering the deletion processing mode, and can be executed anytime during the transition to the deletion processing mode or during the deletion processing mode, including just after entering the deletion processing mode or after detecting that the problem has been resolved (step S87).

Even if the application running on the host 10 is an application that does not monitor the status of the printer 20, the printer thus ignores all commands other than the resume_printing command when in the deletion processing mode. As a result, unprocessed data can be reliably deleted by using the error state mode selection command to tell the printer to execute the deletion processing mode.

As described above, even when using a program that does not monitor the printer 20 status, if the problem (error state) has not been resolved when the normal processing mode is resumed, the first error detection step will return an error (S81 returns Yes), and the deletion processing mode will be immediately resumed.

As will be known from the foregoing description of the present invention, the process mode evaluation unit 43 runs a process to either continue the normal processing mode or enter the deletion processing mode as predetermined according to the cause of the error when the error detection unit 47a detects an error in the printer 20. As a result, the printer 20 and printing system 1 according to the present invention can operate in a processing mode appropriate to the cause of the particular error.

Furthermore, by entering a deletion processing mode that discards data when a printer 20 error is detected, unnecessary printing based on data that was processed before transmission could be interrupted and was left on the host 10 or data that was already transmitted and buffered but not printed can be prevented when the error is corrected and printing resumes.

Furthermore, by continuing operation in the normal processing mode when a printer 20 error is detected, printing can continue from where printing stopped when the error occurred and a printout that is continuous before and after the error can be achieved when the cause of the error is resolved and printing resumes.

Yet further, the error state mode selection command can be configured to select an error handling mode appropriate to the application type, user-desired print results, and cause of error.

For example, if the cause of the error does not result in a physical separation of the paper (that is, the printout), selecting the first processing mode (m1=0) enables a continuous printout. This eliminates the need to resend the print data, and avoids wasting paper.

Yet further, if the second processing mode (m1=1) is selected, all data in the receive buffer 242 is cleared and less time is therefore required for deleting data in the deletion processing mode. If the application monitors the printer 20 status, processing can continue while the status reports from the printer 20 are being monitored, enabling control that does not embed the resume_printing command in the data to be deleted. The printer 20 is preferably set to return the mode transition response in this case.

If the third processing mode (m1=2) is selected, the deletion processing mode is activated with data being left in the receive buffer 242. As a result, the normal processing mode can be resumed by a resume_printing command when the resume_printing command is embedded in data that was already transmitted or data that the data transmission interrupt process of the host 10 was unable to stop. More time is therefore needed to delete data from the receive buffer 242, but even applications that do not monitor the printer 20 status can continue processing with no ill effects. The printer 20 is preferably set to not return the mode transition response in this case.

It should be noted that the present invention has been described using, by way of example, a printing system 1 composed of a host 10 and printer 20, but the invention is not limited to such a printing system. More specifically, the device controlled by the host 10 is not limited to a printer, but can be any of various types of terminal devices.

It will be apparent to one with ordinary skill in the related art, in light of this disclosure, that the system configuration and commands described above can be varied in many ways without departing from the scope of the present invention. For example, the deletion processing mode is enabled after discarding data in the receive buffer 242 and/or print buffer 245 and returning the start_deletion_process response in the foregoing embodiment of the invention, but the order of these operations can be changed as desired to, for example, first enter the deletion processing mode, then send the start_deletion_process response, and then delete data in the receive buffer 242 and/or print buffer 245.

Yet further, the functions of the process mode evaluation unit 43 can be split between the normal processing mode controller 44 and the deletion processing mode controller 45, and the enabled controller 44 or 45 can control passing process control to the other controller.

While the preferred embodiments of the present invention have been described with reference to the accompanying drawings, various modifications, alternatives and/or implementations will be apparent to those skilled in the art in light of the foregoing disclosure. The present invention is intended to embrace all such modifications, alternatives and/or implementation to the extent they fall within the scope of the appended claims.

What is claimed is:

1. A printing apparatus, comprising:
   a receive buffer configured to store data sent from a host device;
   a print buffer configured to store image data;
   a normal processing mode control unit configured to print based on the data sent from the host device;
   a deletion processing mode control unit configured to discard data, except for specific commands sent from the host device;
   an error detection unit configured to detect errors;
   a cause of error determination unit configured to identify the cause of each detected error;
   a processing mode storage unit configured to store a plurality of processing modes, including a normal processing mode, a first deletion processing mode, a second deletion processing mode and a non-deletion processing mode, and information pertaining to which processing mode is to be executed depending on whether an error occurred, and if so, the cause of the error; and
   a processing mode determination unit configured to:
   (1) select the normal processing mode control unit to execute the normal processing mode when the error detection unit detects no error,
   (2) select the deletion processing mode control unit to execute one of the first deletion processing mode or the second deletion processing mode according to the cause of error identified by the cause of error determination unit when the error detection unit detects an error, wherein the first deletion processing mode discards data in the receive buffer and image data in the print buffer and the second deletion processing mode saves data in the receive buffer and discards image data in the print buffer,
   (3) select the normal processing mode control unit to change from one of the deletion processing modes to a normal processing mode based on a resume command from the host device; and
   (4) select the non-deletion processing mode to save data in the receive buffer and save image data in the print buffer when the cause of error determination unit determines that the detected error is of a specified type, so that after the specified type error is corrected data to be printed is printed continuously with immediately preceding data that was printed before the specified type error occurred, without the need for the host to resend data.

2. The printing apparatus of claim 1, wherein the processing mode storage unit stores information pertaining to which deletion processing mode is to be executed for a particular cause of error when an error occurs based on a selection command from the host device.

3. The printing apparatus of claim 2, wherein the selection command includes a first parameter having a value that specifies a particular cause of error and a second parameter having a value that specifies a particular deletion processing mode, the first parameter capable of being set to a value that specifies all causes of error.

4. The printing apparatus of claim 1, wherein the processing mode determination unit selects the normal processing mode control unit to change from one of the deletion processing modes to the normal processing mode when a key code contained in the resume command matches a predefined key code.

5. The printing apparatus of claim 1, further comprising a response transmission unit configured to send the start deletion process response to the host device in conjunction with a change from the normal processing mode to one of the deletion processing modes, and to send the end deletion process response to the host device in conjunction with a change from the deletion processing mode to the normal processing mode.

6. The printing apparatus of claim 5, wherein the response transmission unit, in response to a status inquiry command from the host device, sends the start deletion process response when in one of the deletion processing modes and sends the end deletion process response when in the normal processing mode.

7. The printing apparatus of claim 5, wherein the processing mode storage unit also stores information indicating whether to send a response.

8. The printing apparatus of claim 7, wherein the processing mode storage unit stores information indicating if a response is to be sent for a particular cause of error based on a selection command from the host device.

9. A control method for a printing apparatus configured to run a normal processing mode for printing based on data sent from a host device and a deletion processing mode for discarding data except for specific commands sent from the host device, the control method comprising the steps of:
   (a) storing data sent from the host device in a receive buffer;
   (b) storing image data in a print buffer;
   (c) detecting errors and identifying the cause of each error;
   (d) storing a plurality of processing modes, including a normal processing mode, a first deletion processing mode, a second deletion processing mode and a non-deletion processing mode, and information pertaining to which processing mode is to be executed depending on whether an error occurred, and if so, the cause of the error;
   (e) executing, when an error is detected and its cause identified, the first deletion processing mode, the second deletion processing mode, or the non-deletion processing mode, according to the cause of error, the first deletion processing mode discarding data in the receive buffer and image data in the print buffer, the second deletion processing mode saving data in the receive buffer and discarding image data in the print buffer, and the non-deletion processing mode saving data in the receive buffer and saving image data in the print buffer when the cause of error is detected to be of a specified type, so that after the specified type error is corrected data to be printed is printed continuously with immediately preceding data that was printed before the specified type error occurred, without the need for the host device to resend data; and (f) changing from one of the deletion processing modes to the normal processing mode according to a resume command from the host device, while operating in one of the deletion processing modes.

10. The control method of claim 9, wherein, in step (d), information pertaining to which processing mode is to be executed for a particular cause of error is stored based on a selection command from the host device.

11. The control method of claim 10, wherein the selection command includes a first parameter having a value that specifies a particular cause of error and a second parameter having a value that specifies a particular processing mode, the first parameter capable of being set to a value that specifies all causes of error.

12. The control method of claim 9, wherein step (f) comprises changing from one of the deletion processing modes to the normal processing mode when a key code contained in the resume command matches a predefined key code.

13. The control method of claim 9, further comprising the steps of:

(h) sending the start deletion process response to the host device in conjunction with a change from the normal processing mode to one of the deletion processing modes; and (i) sending the end deletion process response to the host device in conjunction with a change from one of the deletion processing modes to the normal processing mode.

14. The control method of claim 13, further comprising the step of:

(j) sending the start deletion process response in response to a status inquiry command from the host device when in one of the deletion processing modes, and sends the end deletion process response in response to a status inquiry command from the host device when in the normal processing mode.

15. The control method of claim 13, wherein step (d) further comprises storing information indicating whether to send a response.

16. The control method of claim 15, wherein step (d) stores the processing mode to be run and information indicating if a response is to be sent for each cause of error based on a selection command from the host device.

17. A computer-readable medium containing a program for executing on a computer the steps of the printing apparatus control method described in claim 9.

18. A printing system comprising the printing apparatus described in claim 5, the printing system further comprising a host device for controlling the printing apparatus, wherein the host device comprises a data transmission unit configured to stop data transmission to the printing apparatus and to delete unsent data based on a start deletion process response from the printing apparatus, and to send the resume command to the printing apparatus based on an error recovery report from the printing apparatus, and to resume data transmission to the printing apparatus based on an end deletion process response from the printing apparatus.

* * * * *